(12) United States Patent
Fujii et al.

(10) Patent No.: US 11,993,063 B2
(45) Date of Patent: *May 28, 2024

(54) TRANSPARENT RESIN FILM, TRANSPARENT RESIN FILM PRODUCTION METHOD, AND DECORATIVE MATERIAL

(71) Applicant: Dai Nippon Printing Co., Ltd., Tokyo (JP)

(72) Inventors: Ryo Fujii, Tokyo (JP); Satoshi Furuta, Tokyo (JP); Yoshiaki Netsu, Tokyo (JP); Tomomi Nakajima, Tokyo (JP); Yosuke Sumida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/603,120

(22) PCT Filed: Mar. 19, 2020

(86) PCT No.: PCT/JP2020/012388
§ 371 (c)(1),
(2) Date: Oct. 12, 2021

(87) PCT Pub. No.: WO2020/213342
PCT Pub. Date: Oct. 22, 2020

(65) Prior Publication Data
US 2022/0118735 A1 Apr. 21, 2022

(30) Foreign Application Priority Data
Apr. 18, 2019 (JP) .................................. 2019-079081

(51) Int. Cl.
*B32B 3/30* (2006.01)
*B32B 7/12* (2006.01)
(Continued)

(52) U.S. Cl.
CPC .................. *B32B 3/30* (2013.01); *B32B 7/12* (2013.01); *B32B 27/08* (2013.01); *B32B 27/16* (2013.01);
(Continued)

(58) Field of Classification Search
CPC .. B32B 3/30; B32B 7/12; B32B 27/08; B32B 27/16; B32B 27/20; B32B 27/32;
(Continued)

(56) References Cited

U.S. PATENT DOCUMENTS 6,551,687 B1    4/2003   Sato et al.
6,863,956 B1    3/2005   Nakajima et al.
(Continued)

FOREIGN PATENT DOCUMENTS

CN     101279506 A    10/2008
CN     102129092 A    7/2011
(Continued)

OTHER PUBLICATIONS

"Technical materials, Various characteristics of plastic materials," Tonichi Kyosan Cable, Ltd., pp. 93-94 and information sheet in English.
(Continued)

*Primary Examiner* — Betelhem Shewareged
(74) *Attorney, Agent, or Firm* — Locke Lord LLP (57) ABSTRACT

The invention provides a transparent resin film that has a smooth surface on a side to be laminated on a substrate to prevent entering of air bubbles when bonded to a substrate and has a pattern of protrusions and depressions on a side opposite to the side to be laminated on a substrate to provide high design quality, a method for producing the transparent resin film, and a decorative material. The invention relates to a transparent resin film to be laminated on a substrate including a picture layer, the transparent resin film having a
(Continued)

pattern of protrusions and depressions with a maximum height Rz of 20 μm or higher and 200 μm or lower on a side opposite to a side to be laminated on the substrate, the transparent resin film having a maximum height Rz of 20 μm or lower on the side to be laminated on the substrate.

20 Claims, 2 Drawing Sheets

(51) Int. Cl.
    *B32B 27/08*     (2006.01)
    *B32B 27/16*     (2006.01)
    *B32B 27/20*     (2006.01)
    *B32B 27/32*     (2006.01)

(52) U.S. Cl.
    CPC .............. *B32B 27/20* (2013.01); *B32B 27/32* (2013.01); *B32B 2255/10* (2013.01); *B32B 2255/26* (2013.01); *B32B 2307/3065* (2013.01); *B32B 2307/412* (2013.01); *B32B 2451/00* (2013.01)

(58) Field of Classification Search
    CPC ............ B32B 2255/10; B32B 2255/26; B32B 2307/3065; B32B 2307/412; B32B 2451/00
    USPC ....................................................... 428/195.1
    See application file for complete search history.

(56) References Cited

U.S. PATENT DOCUMENTS

| | | |
|---|---|---|
| 2004/0191482 A1 | 9/2004 | Nakajima et al. |
| 2005/0287341 A1 | 12/2005 | Nakajima et al. |
| 2006/0182984 A1* | 8/2006 | Abele ...................... B32B 27/32 428/500 |
| 2007/0042160 A1 | 2/2007 | Nakajima et al. |
| 2007/0231550 A1 | 10/2007 | Stenzel |
| 2008/0051495 A1 | 2/2008 | Murakami et al. |
| 2010/0291317 A1 | 11/2010 | Imaoku et al. |
| 2011/0052880 A1 | 3/2011 | Iizuka et al. |
| 2011/0091690 A1 | 4/2011 | Lin et al. |
| 2011/0151208 A1 | 6/2011 | Huang et al. |
| 2011/0263764 A1 | 10/2011 | Tishkov et al. |
| 2014/0349096 A1 | 11/2014 | Miyazaki et al. |
| 2016/0076528 A1 | 3/2016 | Kato et al. |
| 2016/0089849 A1 | 3/2016 | Kayanoki et al. |
| 2016/0325535 A1 | 11/2016 | Ueno et al. |
| 2018/0043653 A1 | 2/2018 | Sutou et al. |
| 2019/0047246 A1* | 2/2019 | Bayer ..................... B32B 27/34 |
| 2019/0202192 A1 | 7/2019 | Sekino et al. |
| 2019/0248100 A1 | 8/2019 | Horio et al. |
| 2021/0283879 A1 | 9/2021 | Ueno |
| 2022/0001645 A1 | 1/2022 | Fujii et al. |
| 2022/0118735 A1* | 4/2022 | Fujii ..................... B29C 59/046 |

FOREIGN PATENT DOCUMENTS

| | | | |
|---|---|---|---|
| CN | 105142903 A | 12/2015 | |
| CN | 105459526 A | 4/2016 | |
| CN | 108284654 A | 7/2018 | |
| EP | 3098071 A1 | 11/2016 | |
| EP | 3210772 A1 * | 8/2017 | ............ B32B 21/00 |
| EP | 3446873 A1 | 2/2019 | |
| EP | 3521017 A1 | 8/2019 | |
| EP | 3865297 A1 | 8/2021 | |
| JP | H07-256752 A | 10/1995 | |
| JP | H09-141812 A | 6/1997 | |
| JP | H10-211675 A | 8/1998 | |
| JP | H10-217407 A | 8/1998 | |
| JP | H11-115106 A | 4/1999 | |
| JP | H11-157297 A | 6/1999 | |
| JP | 2000-015768 A | 1/2000 | |
| JP | 2000-289162 A | 10/2000 | |
| JP | 2000-335628 A | 12/2000 | |
| JP | 2000-343649 A | 12/2000 | |
| JP | 2001-150540 A | 6/2001 | |
| JP | 2002-036467 A | 2/2002 | |
| JP | 2003-056168 A | 2/2003 | |
| JP | 2004-090507 A | 3/2004 | |
| JP | 2005-120255 A | 5/2005 | |
| JP | 2005-154762 A | 6/2005 | |
| JP | 2005-313142 A | 11/2005 | |
| JP | 2006-068947 A | 3/2006 | |
| JP | 2006-077173 A | 3/2006 | |
| JP | 2006-306020 A | 11/2006 | |
| JP | 2007-090797 A | 4/2007 | |
| JP | 2007-106056 A | 4/2007 | |
| JP | 2007-297568 A | 11/2007 | |
| JP | 2010-069709 A | 4/2010 | |
| JP | 2012035513 A | 2/2012 | |
| JP | 2012-076347 A | 4/2012 | |
| JP | 2012-106506 A | 6/2012 | |
| JP | 2013-104923 A | 5/2013 | |
| JP | 2015-074091 A | 4/2015 | |
| JP | 2016-035036 A | 3/2016 | |
| JP | 2016-074162 A | 5/2016 | |
| JP | 2016-168711 A | 9/2016 | |
| JP | 2016-190480 A | 11/2016 | |
| JP | 2017035011 A | 2/2017 | |
| JP | 2017-042975 A | 3/2017 | |
| JP | 2017-155227 A | 9/2017 | |
| JP | 2018-058284 A | 4/2018 | |
| JP | 2018-089970 A | 6/2018 | |
| JP | 2019-052262 A | 4/2019 | |
| JP | 2019-511970 A | 5/2019 | |
| JP | 2019-155777 A | 9/2019 | |
| JP | 2020-062879 A | 4/2020 | |
| JP | 2020-111062 A | 7/2020 | |
| TW | 201114624 A | 5/2011 | |
| TW | 201827223 A | 8/2018 | |
| WO | 2018/062299 A1 | 4/2018 | |
| WO | 2018/062340 A1 | 4/2018 | |

OTHER PUBLICATIONS

Written Opinion of the ISA dated Jun. 16, 2020, issued for PCT/JP2020/012394.

* cited by examiner

TRANSPARENT RESIN FILM, TRANSPARENT RESIN FILM PRODUCTION METHOD, AND DECORATIVE MATERIAL

TECHNICAL FIELD

The present invention relates to a transparent resin film, a method for producing a transparent resin film, and a decorative material.

BACKGROUND ART

Decorative materials are commonly used for decorating components used in building materials, furniture, home electrical appliances, or the like.

Decorative materials consisting only of a substrate including a picture layer commonly have insufficient surface properties such as scratch resistance, contamination resistance, and weather resistance. Accordingly, a thermoplastic resin film is laminated on the substrate to impart surface properties.

In order to impart a visual or tactile design to decorative materials, a pattern of protrusions and depressions may be formed by embossing the thermoplastic resin film to be laminated on the substrate.

Patent Literature 1, for example, discloses a decorative sheet including a base sheet on which printing is performed and a protective sheet laminated on the base sheet. The decorative sheet has a surface embossed to have a pattern of protrusions and depressions for imparting a design.

Conventionally, there has been a case where, in the embossing of a thermoplastic resin film, a bit of a pattern of protrusions and depressions corresponding to the pattern of protrusions and depressions on the embossed side is unintendedly formed on the opposite side.

Thus, upon bonding a thermoplastic resin film and a substrate with an adhesive or the like, air bubbles are likely to enter between the thermoplastic resin film and the adhesive to possibly impair the design quality or lower the adhesion strength, which leaves room for improvement.

CITATION LIST

Patent Literature

Patent Literature 1: JP 2000-15768 A

SUMMARY OF INVENTION

Technical Problem

The present invention aims to solve the above problem and provide a transparent resin film that has an extremely smooth surface on a side to be laminated on a substrate to prevent entering of air bubbles when bonded to a substrate and has a pattern of protrusions and depressions on a side opposite to the side to be laminated on a substrate to provide high design quality, a method for producing the transparent resin film, and a decorative material.

Solution to Problem

The present inventors made intensive studies to solve the above problem, and focused on the characteristics of a transparent resin film.

The present inventors found out that a transparent resin film having a structure including a predetermined pattern of protrusions and depressions on a side opposite to a side to be laminated on a substrate and an extremely smooth surface on the side to be laminated on a substrate can prevent entering of air bubbles and also impart a design. Thus, the present invention was completed.

Specifically, the present invention relates to a transparent resin film to be laminated on a substrate including a picture layer, the transparent resin film having a pattern of protrusions and depressions with a maximum height Rz (1) defined in JIS B 0601 (2001) of 20 μm or higher and 200 μm or lower on a side opposite to a side to be laminated on the substrate, the transparent resin film having a maximum height Rz (2) defined in JIS B 0601 (2001) of 15 μm or lower on the side to be laminated on the substrate.

Preferably, the transparent resin film of the present invention includes at least multiple transparent resin layers.

Preferably, the transparent resin film includes a surface protective layer on the side opposite to the side to be laminated on the substrate.

Preferably, the transparent resin film contains a flame retardant.

Preferably, a layer containing the flame retardant in the transparent resin film contains a filler.

Preferably, the surface protective layer contains a flame retardant.

Preferably, the flame retardant is at least one selected from the group consisting of a phosphinic acid metal salt-based flame retardant, a phosphazene-based flame retardant, and a NOR hindered amine-based flame retardant.

The present invention also relates to a method for producing a transparent resin film to be laminated on a substrate including a picture layer, the method including: laminating multiple transparent resin layers by thermal lamination to provide a laminate while embossing a side of the laminate opposite to a side to be laminated on the substrate to form a pattern of protrusions and depressions having a maximum height Rz (1) defined in JIS B 0601 (2001) of 20 μm or higher and 200 μm or lower on the side opposite to the side to be laminated on the substrate, the transparent resin film having a maximum height Rz (2) defined in JIS B 0601 (2001) of 15 μm or lower on the side to be laminated on the substrate.

Preferably, in the method for producing a transparent resin film of the present invention, the embossing is performed using a press roll having a type D durometer hardness defined in JIS K 6253-3 (2012) of 25 or more and 50 or less.

The present invention also relates to a decorative material including: a substrate including a picture layer; and the transparent resin film of the present invention laminated on the substrate.

Advantageous Effects of Invention

The present invention can provide a transparent resin film that has an extremely smooth surface on a side to be laminated on a substrate to prevent entering of air bubbles when bonded to the substrate and has a pattern of protrusions and depressions on a side opposite to the side to be laminated on the substrate to provide high design quality, a method for producing the transparent resin film, and a decorative material.

DESCRIPTION OF EMBODIMENTS

<Transparent Resin Film>

A description is given on the transparent resin film of the present invention hereinbelow.

The numerical range indicated by "-" herein means "the lower limit or larger and the upper limit or smaller" (e.g., the range "α-β" refers to the range "α or larger and β or smaller").

Figure 1:
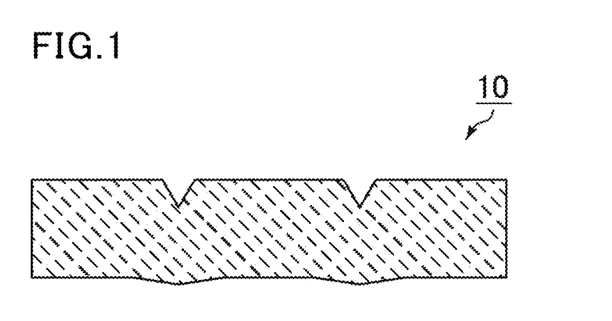
FIG. 1 is a cross-sectional view illustrating an embodiment of the transparent resin film of the present invention.

FIG. 1 is a cross-sectional view illustrating an embodiment of the transparent resin film of the present invention.

As illustrated in FIG. 1, a transparent resin film 10 of the present invention has a pattern of protrusions and depressions on a side opposite to a side to be laminated on a substrate.

The pattern of protrusions and depressions has a maximum height Rz (1) defined in JIS B 0601 (2001) of 20 μm or higher and 200 μm or lower.

The transparent resin film 10 having the pattern of protrusions and depressions can improve the design quality. When the maximum height Rz (1) is lower than 20 μm, a design imparted may be insufficient. When the maximum height Rz (1) is higher than 200 μm, a pattern of protrusions and depressions corresponding to the pattern of protrusions and depressions is unintendedly formed on the side to be laminated on a substrate, which may allow entering of air bubbles.

The maximum height Rz (1) is preferably 40 μm or higher and 180 μm or lower, more preferably 60 μm or higher and 160 μm or lower.

Herein, the maximum heights Rz (1) and (2) defined in JIS B 0601 (2001) can be determined by the measurement using a surface profilometer ("SURFCOM-FLEX-50A", available from Tokyo Seimitsu Co., Ltd.) under the following conditions.

(Measurement Condition)
Number of measurements: n=5 (at any five points)
Standard for calculation: JIS'01
Measurement type: roughness measurement
Evaluation length: 12.5 mm
Cut-off value: 2.5 mm
Measurement speed: 0.60 mm/s
Filter type: Gaussian filter
Form elimination: straight line
λs value: 8.0 μm In the case of a directional pattern of protrusions and depressions such as a wood-grain vessel pattern or a hairline pattern, the measurement is performed in the flow direction and in a direction perpendicular to the flow direction, and the layer measurement value is taken as the maximum height (Rz).

A part where the pattern of protrusions and depressions is provided is selected as the measurement site in the measurement.

The transparent resin film 10 has a maximum height Rz (2) defined in JIS B 0601 (2001) of 15 μm or lower on the side to be laminated on a substrate.

The transparent resin film 10 thus has an extremely smooth surface on the side to be laminated on a substrate to prevent entering of air bubbles when bonded to the substrate.

From the standpoint of preventing entering of air bubbles, the maximum height Rz (2) is preferably 13 μm or lower, more preferably 10 μm or lower.

The transparent resin film 10 has a thickness of preferably 500 μm or less.

When the transparent resin film 10 has a thickness of more than 500 μm, the temperature may be different between the front and back of the transparent resin film. In such a case, a molten resin on the heated side during embossing may shrink more to warp the entire film, which possibly makes the transparent resin film 10 have bent side ends.

From the above standpoint, the transparent resin film 10 has a thickness of more preferably 460 μm or less, still more preferably 420 μm or less.

From the standpoint of avoiding impairment of the design quality due to depressions penetrating the film, the transparent resin film 10 should have a thickness larger than the Rz (1).

The transparent resin film 10 preferably contains a flame retardant.

When at least one layer in the transparent resin film 10 contains a flame retardant, flammability is reduced by formation of char or capture of radicals in combustion gas, or the like during combustion.

Examples of the flame retardant include phosphinic acid metal salt-based flame retardants, phosphazene-based flame retardants, halogen-based flame retardants, NOR hindered amine-based flame retardants, antimony-based flame retardants, metal hydroxide-based flame retardants, and phosphoric acid ester-based flame retardants. From the environmental standpoint and the standpoint of reducing the amount added for maintaining the transparency of the layer containing the flame retardant, preferred is at least one selected from the group consisting of phosphinic acid metal salt-based flame retardants, phosphazene-based flame retardants, and NOR hindered amine-based flame retardants. From the standpoint that it can trap radicals generated from organic matters during combustion to disturb continuous combustion and exhibits an effect of suppressing flame spread in a horizontal flammability test, preferred is at least one selected from the group consisting of phosphinic acid metal salt-based flame retardants and phosphazene-based flame retardants. From the standpoint of achieving an effect of reducing the calorific value in the flammability test in accordance with ISO 5660-1, preferred is a NOR hindered amine-based flame retardant.

One of these flame retardants may be used alone, or two or more thereof may be used in admixture.

The flame retardant may be contained in at least one layer of the layers constituting the transparent resin film 10. In this case, in order to achieve effective improvement of the flame retardancy, the flame retardant is preferably contained in an upper layer (layer on the side opposite to the side to be laminated on a substrate).

The transparent resin film 10 may contain a filler, in particular, preferably contains fumed silica described later.

(Transparent Resin Layer)

The transparent resin film 10 preferably includes at least multiple transparent resin layers.

Figure 2:
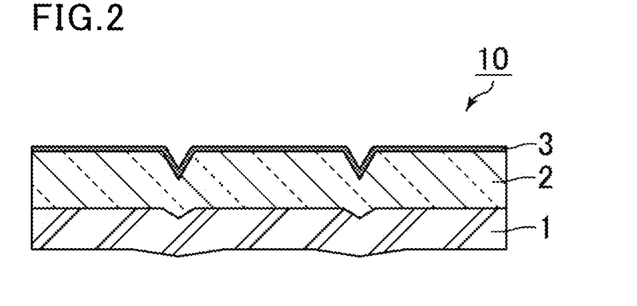
FIG. 2 is a cross-sectional view illustrating another embodiment of the transparent resin film of the present invention.

FIG. 2 is a cross-sectional view illustrating another embodiment of the transparent resin film of the present invention.

As illustrated in FIG. 2, the transparent resin film 10 of the present invention preferably includes at least multiple transparent resin layers (base layer 1 and top layer 2) and also preferably includes a surface protective layer 3 on the side opposite to the side to be laminated on a substrate.

The transparent resin layers each may be any colorless and transparent, colored transparent, or translucent layer through which the picture layer of the substrate is visible. The transparent resin layers each may be made of any material, and preferably contains a thermoplastic resin.

Examples of the thermoplastic resin include: olefin-based thermoplastic resins such as low-density polyethylene (including linear low-density polyethylene), medium-density polyethylene, high-density polyethylene, ethylene-α olefin copolymers, homopolypropylene, polymethylpentene, polybutene, ethylene-propylene copolymers, propylene-butene copolymers, ethylene-vinyl acetate copolymers, saponified ethylene-vinyl acetate copolymers, or mixtures of these; thermoplastic ester-based resins such as polyethylene terephthalate, polybutylene terephthalate, polyethylene naphthalate, polyethylene naphthalate-isophthalate copolymers, polycarbonate, or polyarylate; acrylic thermoplastic resins such as polymethyl methacrylate, polyethyl methacrylate, polyethyl acrylate, or polybutyl acrylate; polyamide-based thermoplastic resins such as Nylon 6 or Nylon 66; polyimide; polyurethane; polystyrene; acrylonitrile-butadiene-styrene resins; ionomers; and polyvinyl chloride resins.

Each of these thermoplastic resins may be used alone or two or more thereof may be used in admixture. In particular, olefin-based thermoplastic resins are preferred because they have excellent printability of a picture layer and excellent embossability and are inexpensive.

The transparent resin layers may have any thickness. The thickness is preferably 90 μm or more and 300 μm or less, more preferably 150 μm or more and 300 μm or less, still more preferably 200 μm or more and 250 μm or less.

The transparent resin layers may be colored. In that case, colorants may be added to the thermoplastic resin. Examples of usable colorants include pigments or dyes used in a picture layer described later.

The transparent resin layers preferably contain a flame retardant.

When the transparent resin layers contain a flame retardant, flammability is reduced by formation of char, capture of radicals in combustion gas, or the like during combustion.

Examples of the flame retardant include phosphinic acid metal salt-based flame retardants, phosphazene-based flame retardants, NOR hindered amine-based flame retardants, halogen-based flame retardants, antimony-based flame retardants, metal hydroxide-based flame retardants, and phosphoric acid ester-based flame retardants.

From the environmental standpoint and the standpoint of reducing the amount added for maintaining the transparency of the layer containing the flame retardant, preferred is at least one selected from the group consisting of phosphinic acid metal salt-based flame retardants, phosphazene-based flame retardants, and NOR hindered amine-based flame retardants. From the standpoint that it can trap radicals generated from organic matters during combustion to disturb continuous combustion and exhibits an effect of suppressing flame spread in a horizontal flammability test, preferred is at least one selected from the group consisting of phosphinic acid metal salt-based flame retardants and phosphazene-based flame retardants. From the standpoint of achieving an effect of reducing the calorific value in the flammability test in accordance with ISO 5660-1, preferred is a NOR hindered amine-based flame retardant.

Examples of the phosphinic acid metal salt-based flame retardants include aluminum tris(diethylphosphinate), aluminum tris(methyl ethyl phosphinate), aluminum tris(diphenyl phosphinate), zinc bis(diethyl phosphinate), zinc bis(methyl ethyl phosphinate), zinc bis(diphenyl phosphinate), titanyl bis(diethyl phosphinate), titanium tetrakis(diethyl phosphinate), titanyl bis(methyl ethyl phosphinate), titanium tetrakis(methyl ethyl phosphinate), titanyl bis(diphenyl phosphinate), and titanium tetrakis(diphenyl phosphinate).

Examples of commercially available phosphinic acid metal salt-based flame retardants include "EXOLIT OP-930", "EXOLIT OP-935", "EXOLIT OP-1230", "EXOLIT OP-1240", and "EXOLIT OP-1312" (product name) all available from Clariant Japan.

Examples of the phosphazene-based flame retardants include: phenoxy phosphazene; cyclic and/or linear $C_{1-6}$ alkyl $C_{6-20}$ aryloxy phosphazene such as (poly)tolyloxyphosphazene (e.g., o-tolyloxyphosphazene, m-tolyloxyphosphazene, p-tolyloxyphosphazene, o,m-tolyloxyphosphazene, o,p-tolyloxyphosphazene, m,p-tolyloxyphosphazene, o,m,p-tolyloxyphosphazene), (poly) xylyloxyphosphazene; and cyclic and/or linear $C_{6-20}$ aryl $C_{1-10}$ alkyl $C_{6-20}$ aryloxy phosphazene such as (poly)phenoxytolyloxyphosphazene (e.g., phenoxy o-tolyloxyphosphazene, phenoxy m-tolyloxyphosphazene, phenoxy p-tolyloxyphosphazene, phenoxy o,m-tolyloxyphosphazene, phenoxy o,p-tolyloxyphosphazene, phenoxy m,p-tolyloxyphosphazene, phenoxy o,m,p-tolyloxyphosphazene), (poly) phenoxyxylyloxyphosphazene, and (poly) phenoxytolyloxyxylyloxyphosphazene. Preferred examples include cyclic and/or linear phenoxy phosphazene, cyclic and/or linear $C_{1-3}$ alkyl $C_{6-20}$ aryloxy phosphazene, and $C_{6-20}$ aryloxy $C_{1-3}$ alkyl $C_{6-20}$ aryloxy phosphazene such as cyclic and/or linear tolyloxyphosphazene and cyclic and/or linear phenoxytolylphenoxyphosphazene.

The examples further include compounds having a crosslinked structure of a 4,4'-diphenylene group such as compounds having a crosslinked structure of 4,4'-sulfonyldiphenylene (bisphenol S residue), compounds having a crosslinked structure of a 2,2-(4,4'-diphenylene)isopropylidene group, compounds having a crosslinked structure of a 4,4'-oxydiphenylene group, and compounds having a crosslinked structure of a 4,4'-thiodiphenylene group.

Examples of the NOR hindered amine-based flame retardants include 1-cyclohexyloxy-2,2,6,6-tetramethyl-4-octadecylaminopiperidine; bis(1-octyloxy-2,2,6,6-tetramethylpiperidin-4-yl)sebacate; 2,4-bis[(1-cyclohexyloxy-2,2,6,6-tetramethylpiperidin-4-yl)butylamino]-6-(2-hydroxyethylamino)-s-triazine; bis(1-cyclohexyloxy-2,2,6,6-tetramethylpiperidin-4-yl)adipate; an oligomeric compound that is a condensation product of 4,4'-hexamethylenebis(amino-2,2,6,6-tetramethylpiperidine) and 2,4-dichloro-6-[(1-octyloxy-2,2,6,6-tetramethylpiperidin-4-yl) butylamino]-s-triazine end-capped with 2-chloro-4,6-bis (dibutylamino)-s-triazine; an oligomeric compound that is a condensation product of 4,4'-hexamethylenebis(amino-2,2, 6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine; 2,4-bis[(1-cyclohexyloxy-2,2,6,6-piperidin-4-yl)-6-chloro-s-triazine; a reaction product of peroxidized 4-butylamino-2,2,6,6-tetramethylpiperidine, 2,4,6-trichloro-s-triazine, cyclohexane, and N,N'-ethan-1,2-diylbis(1,3-propanediamine) (N,N',N'''-tris{2,4-bis[(1-cyclohexyloxy-2,2, 6,6-tetramethylpiperidin-4-yl)n-butylamino]-s-triazin-6-yl}-3,3'-ethylenediiminodipropylamine); bis(1-undecanoxy-2,2,6,6-tetramethylpiperidin-4-yl)carbonate; 1-undecyloxy-2,2,6,6-tetramethylpiperidin-4-one; and bis(1-stearyloxy-2, 2,6,6-tetramethylpiperidin-4-yl)carbonate. Examples of commercially available NOR hindered amine-based flame retardants include FlamestabNOR116FF, TINUVIN NOR371, TINUVIN XT850FF, TINUVIN XT855FF, and TINUVIN PA123 all available from BASF SE and LA-81 available from ADEKA Corporation.

Each of the flame retardants may be used alone or two or more thereof may be used in admixture.

The flame retardant may be contained in at least one layer of the transparent resin layers. In order to achieve effective improvement of the flame retardancy, the flame retardant is preferably contained in the top layer 2 which is an upper layer.

In the case where at least one layer of the transparent resin layers contains the flame retardant, the amount of the flame retardant is preferably 3% by mass or more, more preferably 4.4% by mass or more based on 100% by mass of the total mass of the transparent resin layers.

The amount of the flame retardant is preferably 20% by mass or less, more preferably 15% by mass or less based on 100% by mass of the total mass of the transparent resin layers.

When the lower limit of the amount of the flame retardant is within the above range, the flame retardancy of the transparent resin film 10 is further improved. When the upper limit of the amount of the flame retardant is within the above range, the transparency of the transparent resin film 10 is further maintained.

The transparent resin layers preferably contain a filler.

Any filler that does not impair the transparency of the transparent resin layers may be used. In order to achieve still better sharpness (referring to visibility of a picture layer described later) of a decorative material including the transparent resin film 10, preferred is a filler having an average particle size not larger than the visible light wavelength. Examples of the filler include inorganic fillers such as silica, calcium carbonate, talc, and clay.

The filler is preferably contained in at least one layer of the transparent resin layers, or preferably contained in the same layer as the layer containing the flame retardant. In other words, at least one layer of the transparent resin layers preferably contains the flame retardant and the filler.

In the case where at least one layer of the transparent resin layers contains the flame retardant, the transparent resin layer containing the flame retardant preferably further contains an inorganic filler having a polar group on its surface. When the transparent resin layer containing the flame retardant further contains an inorganic filler having a polar group on its surface, the sharpness and flame retardancy of a decorative material including the transparent resin film 10 are further improved. A polar portion of the flame retardant is attracted to the polar group on the surface of the inorganic filler having a polar group. The presence of the flame retardant on the surface improves dispersibility, which presumably provides the above effect. Usable examples of the inorganic filler having a polar group on its surface include a hydrophilic inorganic filler such as an inorganic filler having a hydroxy group (e.g., silanol group) on its surface. More specifically, hydrophilic silica can be used.

The silica used as the filler may be either natural or synthetic, and may be either crystalline or amorphous. In the case of synthetic amorphous silica, it may be prepared by either a wet method or a dry method. Synthetic wet silica prepared by a wet method may be prepared by any method including a precipitation method and a gelling method. Synthetic dry silica prepared by a dry method may be prepared by any method including a combustion method and an arc method. The silica used preferably has a small average particle size in order to further improve the sharpness of a decorative material including the transparent resin film 10. More preferred is fumed silica or hydrophilic fumed silica obtainable by a combustion method.

The filler such as the hydrophilic fumed silica has a BET specific surface area of preferably 50 $m^2/g$ or larger, more preferably 130 $m^2/g$ or larger, still more preferably 200 $m^2/g$ or larger. When the lower limit of the BET specific surface area of the filler is within the above range, the silica has a small average particle size and, in the case of hydrophilic fumed silica, the amount of silanol increases. As a result, reduction in transparency of the transparent resin layers caused by addition of the filler is further reduced or prevented and the dispersibility of the flame retardant is further improved, which further improves the flame retardancy of the transparent resin film 10 and the sharpness of a decorative material including the transparent resin film 10. When the lower limit of the BET specific surface area of the filler is within the above range, the flame retardancy of the transparent resin film 10 is improved, which enables reduction of the amount of the flame retardant.

The BET specific surface area as used herein is determined by a nitrogen adsorption method in conformity with DIN 66131.

The hydrophilic fumed silica used as the filler may be a commercial product. Examples of the commercial product include AEROSIL 50, AEROSIL 130, AEROSIL 200, AEROSIL 300, and AEROSIL 380 all available from Nippon Aerosil Co., Ltd.

In the case where the transparent resin layers contain the flame retardant and the filler, the amount of the filler in the transparent resin layers is preferably 50 parts by mass or more, more preferably 100 parts by mass or more, still more preferably 200 parts by mass or more per 100 parts by mass of the flame retardant contained in the transparent resin layers. When the lower limit of the amount of the filler in the transparent resin layers is within the above range, sharpness of a decorative material including the transparent resin film 10 is further improved. The amount of the filler in the transparent resin layers is preferably 25 parts by mass or less, more preferably 20 parts by mass or less, still more preferably 10 parts by mass or less.

The transparent resin layers may further contain additives such as matting agents, blowing agents, lubricants, antistatic agents, antioxidants, ultraviolet absorbers, light stabilizers, radical scavengers, and soft components (e.g., rubber).

The transparent resin layers may be subjected to surface treatment such as saponification treatment, glow discharge treatment, corona discharge treatment, plasma discharge treatment, ultraviolet (UV) treatment, or flame treatment, within a range of the gist of the present invention.

The materials of the base layer 1 and the top layer 2 constituting the transparent resin layers may be appropriately selected from the thermoplastic resins mentioned above.

The base layer 1 is a layer located closer to the side to be laminated on the substrate, and the material thereof is preferably an olefin-based thermoplastic resin or an ionomer among the above thermoplastic resins. In particular, from the standpoint of favorably imparting scratch resistance or the like, preferred is polypropylene-based material such as an ethylene-α-olefin copolymer, homopolypropylene, an ethylene-propylene copolymer, or a propylene-butene copolymer.

The base layer 1 may have any thickness. The thickness is preferably, for example, 30 μm or more and 150 μm or less, more preferably 40 μm or more and 120 μm or less, still more preferably 50 μm or more and 100 μm or less.

The top layer 2 is a layer located closer to the side opposite to the side to be laminated on the substrate, and the material thereof is preferably an olefin-based thermoplastic resin or an ionomer among the above thermoplastic resins. In particular, from the standpoint of favorably imparting scratch resistance or the like, preferred is a polypropylene-based material such as homopolypropylene, an ethylene-propylene copolymer, or a propylene-butene copolymer.

The top layer 2 may have any thickness and the thickness may be determined in accordance with the thickness of the base layer 1 or the like. From the standpoint of favorably imparting scratch resistance or the like, the thickness is preferably 30 µm or more and 250 µm or less, more preferably 40 µm or more and 200 µm or less, still more preferably 50 µm or more and 150 µm or less.

The base layer 1 and the top layer 2 may be laminated with a transparent adhesive layer between them or laminated by thermal lamination. They are preferably laminated by thermal lamination as it requires no adhesive to eliminate concerns about peeling due to adhesive degradation or the like.

The thermal lamination may be performed by a known method such as melt coextrusion using a T die.

(Transparent Adhesive Layer)

A known adhesive may be used as the transparent adhesive layer. Examples of the adhesive include polyurethanes, acrylic resins, polyolefins, polyvinyl acetates, polyvinyl chlorides, vinyl chloride-vinyl acetate copolymers, ethylene-acrylic acid copolymers, and ionomers. The examples further include butadiene-acrylic nitrile rubber, neoprene rubber, and natural rubber. Each of these adhesives may be used alone or in combination of two or more.

The transparent adhesive layer has a dry thickness of preferably about 0.1-30 µm, more preferably about 1-5 µm.

(Surface Protective Layer)

From the standpoint of imparting surface properties such as scratch resistance, abrasion resistance, water resistance, and contamination resistance, the transparent resin film 10 preferably includes the surface protective layer 3 on the side opposite to the side to be laminated on the substrate.

Resin contained in the surface protective layer 3 preferably includes at least one curable resin such as a thermosetting resin and an ionizing radiation curable resin. In order to achieve high surface hardness, high productivity, high weather resistance, or the like, more preferred is an ionizing radiation curable resin.

The ionizing radiation curable resin may be any resin that undergoes crosslinking polymerization in response to irradiation with ionizing radiation to change its structure to a three-dimensional polymer structure.

For example, one or more of a prepolymer, oligomer, and monomer having a polymerizable unsaturated bond that is crosslinkable in response to irradiation with ionizing radiation or an epoxy group in the molecule. Examples thereof include acrylate resins such as urethane acrylate (e.g., bifunctional ether-based urethane oligomer, polyfunctional urethane oligomer), polyester acrylate, and epoxy acrylate; silicon resins such as siloxane; polyester resins; and epoxy resins.

Examples of the ionizing radiation include visible light, ultraviolet light (e.g., near ultraviolet light, vacuum ultraviolet light), X rays, electron beams, and ion beams. Among these, preferred are ultraviolet light and electron beams.

The ultraviolet light source used may be a light source such as an ultra-high pressure mercury lamp, a high-pressure mercury lamp, a low-pressure mercury lamp, a carbon-arc lamp, a black light fluorescent lamp, and a metal halide lamp. The wavelength of the ultraviolet light is about 190-380 nm, for example.

The electron beam source used may be an electron beam accelerator of any type such as Cockcroft-Walton type, Van de Graaff type, resonant transformer type, insulating core transformer type, linear type, Dynamitron type, or radio frequency type.

The electron beam preferably has an energy of about 100-1000 keV, more preferably about 100-300 keV. The electron beam dose is preferably 2-15 Mrad.

The ionizing radiation curable resin is sufficiently cured by irradiation with an electron beam. Still, in the case of curing by irradiation with ultraviolet light, a photopolymerization initiator (sensitizer) is preferably added.

The photopolymerization initiator used may be, in the case of a resin having a radical polymerizable unsaturated group, at least one selected from acetophenones, benzophenones, thioxanthones, benzoin, benzoin methyl ether, Michler-Benzoyl benzoate, Michler's ketone, diphenyl sulfide, dibenzyl disulfide, diethyl oxide, triphenyl biimidazole, and isopropyl-N,N-dimethylaminobenzoate.

In the case of a resin having a cationic polymerizable functional group, the photopolymerization initiator used may be at least one selected from aromatic diazonium salts, aromatic sulfonium salts, metallocene compounds, benzoin sulfonic acid esters, and furyloxy sulfoxonium diallyl iodosyl salts.

The amount of the photopolymerization initiator is not limited, and is about 0.1-10 parts by mass per 100 parts by mass of the ionizing radiation curable resin, for example.

The surface protective layer 3 preferably contains a flame retardant.

The flame retardant used may be appropriately selected from those mentioned for the transparent resin layers and is preferably at least one selected from phosphinic acid metal salt-based flame retardants, phosphazene-based flame retardants, and NOR hindered amine-based flame retardants. When the surface protective layer 3 contains a flame retardant, the flame retardant exhibits functions such as formation of char or capture of radicals in combustion gas in response to heat applied from the surface during combustion. Thus, flammability can be reduced.

The lower limit of the amount of the flame retardant in the surface protective layer 3 is preferably 3% by mass or more, more preferably 4.4% by mass or more based on 100% of the total mass of the surface protective layer 3. The upper limit of the amount of the flame retardant is preferably 20% by mass or less, more preferably 15% by mass or less.

The surface protective layer 3 may be formed from the ionizing radiation curable resin by applying a solution of the ionizing radiation curable resin by an application method such as gravure coating or roll coating.

Examples of the thermosetting resin include unsaturated polyester resins, polyurethane resins (including two-component curable polyurethanes), epoxy resins, aminoalkyd resins, phenolic resins, urea resins, diallylphthalate resins, melamine resins, guanamine resins, melamine-urea cocondensated resins, silicon resins, and polysiloxane resins.

To the thermosetting resin may be added curing agents and polymerization accelerators such as crosslinking agents and polymerization initiators. For example, to an unsaturated polyester resin or polyurethane resin may be added an isocyanate or an organic sulfonic acid salt as a curing agent. To an epoxy resin may be added an organic amine or the like. To an unsaturated polyester resin may be added a radical initiator such as a peroxide (e.g., methyl ethyl ketone peroxide) or azoisobutyl nitrile.

The surface protective layer 3 may be formed from the thermosetting resin, for example, by applying a solution of the thermosetting resin by an application method such as roll coating or gravure coating, followed by drying and curing.

The surface protective layer 3 has a thickness of preferably 0.1-50 µm, more preferably 1-20 µm.

In order to additionally impart scratch resistance and abrasion resistance to the surface protective layer 3, an inorganic filler may be added. Examples of the inorganic filler include powders of aluminum oxide, silicon carbide, silicon dioxide, calcium titanate, barium titanate, magnesium pyroborate, zinc oxide, silicon nitride, zirconium oxide, chromium oxide, iron oxide, boron nitride, diamond, emery, talc, and glass fiber.

The amount of the inorganic filler is about 1-80 parts by mass per 100 parts by mass of the ionizing radiation curable resin.

From the standpoint of improving the flame retardancy while maintaining the sharpness of a decorative material including the transparent resin film 10, the surface protective layer 3 preferably contains the flame retardant and the inorganic filler.

The inorganic filler used may be appropriately selected from those mentioned for the transparent resin layers. The inorganic filler is preferably silica, more preferably fumed silica in consideration of the dispersibility of the flame retardant, still more preferably a hydrophilic fumed silica among the fumed silica.

The surface protective layer 3 may further contain additives, if needed. Examples of the additives include: thermoplastic resins such as urethane resins, polyvinyl acetal resins, polyester resins, polyolefin resins, styrene-based resins, polyamide resins, polycarbonate resins, acetal resins, vinyl chloride-vinyl acetate copolymers, vinyl acetate resins, acrylic resins, and cellulosic resins; lubricants such as silicone resins, wax, and fluororesins; light stabilizers such as hindered amine-based radical scavengers; gloss or tactile impression modifiers such as acrylic beads and mica; and colorants such as dyes and pigments.

(Primer Layer)

The transparent resin film 10 may include a primer layer in addition to the above structure.

The primer layer can be formed by application of a known primer agent. Examples of the primer agent include urethane resin-based primer agents containing acrylic-modified urethane resins (acrylic urethane-based resins), primer agents containing urethane-cellulose-based resins (e.g., resin obtained by adding hexamethylene diisocyanate to a mixture of urethane and nitrocellulose), and resin-based primer agents containing acrylic-urethane block copolymers. To the primer agent may be optionally added additives. Examples of the additives include fillers such as calcium carbonate or clay, flame retardants such as magnesium hydroxide, antioxidants, lubricants, blowing agents, ultraviolet absorbers, and light stabilizers. The amounts of the additives may be appropriately determined in accordance with the product characteristics.

The primer layer may have any thickness. For example, the thickness is preferably 0.01-10 µm, more preferably 0.1-1 µm.

(Method for Producing Transparent Resin Film)

The present invention also relates to a method for producing a transparent resin film to be laminated on a substrate including a picture layer, the method including: laminating multiple transparent resin layers by thermal lamination to provide a laminate while embossing a side of the laminate opposite to a side to be laminated on the substrate to form a pattern of protrusions and depressions having a maximum height Rz (1) defined in JIS B 0601 (2001) of 20 µm or higher and 200 µm or lower on the side opposite to the side to be laminated on the substrate, the transparent resin film having a maximum height Rz (2) defined in JIS B 0601 (2001) of 15 µm or lower on the side to be laminated on the substrate.

The method for producing a transparent resin film of the present invention includes a step of laminating at least multiple transparent resin layers (base layer 1, top layer 2) by thermal lamination to provide a laminate while embossing the side of the laminate opposite to the side to be laminated on the substrate.

The temperature for the thermal lamination is preferably 20° C. or higher and 60° C. or lower, more preferably 30° C. or higher and 50° C. or lower from the standpoint of cooling and fixing the formed pattern simultaneously with the embossing of the molten resin.

The molten resin may be cooled by any method, and an exemplary method is a cooling method using a chill roll for cooling.

The thermal lamination may be performed by a known method such as melt coextrusion using a T die.

The embossing may be performed, for example, using a known sheet- or rotary embosser. For example, a pattern of protrusions and depressions may be transferred under the conditions of a sheet temperature of 120° C.-160° C. and a pressure of 10-40 kg/cm².

The press roll used in the embossing has a type D durometer hardness defined in JIS K 6253-3 (2012) of preferably 25 or more and 50 or less, more preferably 30 or more and 45 or less from the standpoint of favorably reducing or preventing formation of a pattern of protrusions and depressions on the opposite side to the embossed side. Too soft a press roll is likely to form a pattern recognizable even from the rear side and too hard a press roll is likely to transmit a vibration from the machine to significantly change the thickness of the molten resin, resulting in a thickness variation.

The hardness is measured as follows. An indenter point of a type D durometer is pressed against a curved portion of a press roll to deform the press roll. The indentation depth at which the resistance force of the roll and the force of the spring are in balance is used for determining the hardness.

Embossing on the transparent resin film 10 may be performed before or after formation of the surface protective layer 3.

In an exemplary specific embodiment 1), after sequential formation of the base layer 1 and the top layer 2, the surface protective layer 3 is formed, and embossing is finally performed. In another exemplary specific embodiment 2), after sequential formation of the base layer 1 and the top layer 2, embossing is performed, and the surface protective layer 3 is finally formed. In still another exemplary embodiment 3), after sequential formation of the base layer 1 and the top layer 2 and following embossing, the primer layer is provided, and the surface protective layer 3 is finally formed. Preferred among these is the embodiment 2). Most preferably, the chill roll for cooling used for sequential formation of the base layer 1 and the top layer 2 has an emboss pattern to enable embossing simultaneously with formation of the layers (i.e., chill roll embossing).

<Decorative Material>

Figure 3:
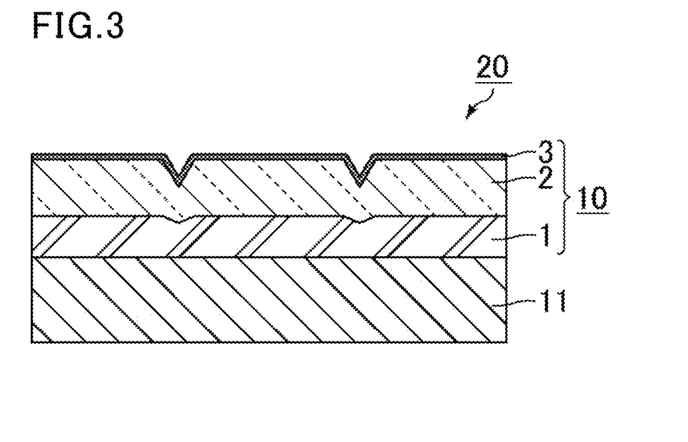
FIG. 3 is a cross-sectional view illustrating an embodiment of the decorative material of the present invention.

The present invention also relates to a decorative material including a substrate including a picture layer and the transparent resin film 10 laminated on the substrate.

FIG. 3 is a cross-sectional view illustrating an embodiment of the decorative material of the present invention.

As illustrated in FIG. 3, a decorative material 20 of the present invention has a structure in which the transparent resin film 10 is laminated on a substrate 11 including a picture layer. The transparent resin film 10 preferably includes the base layer 1 having one side to be laminated on the substrate 11 including a picture layer, the top layer 2 facing the other side of the base layer 1, and the surface protective layer 3 facing the top layer 2.

The substrate 11 including a picture layer (hereafter, simply referred to as substrate 11) includes, for example, a substrate sheet and a picture layer.

The substrate 11 may also be a decorative board including a support described later and a picture layer or an adherend including a picture layer described later.

Specifically, the decorative material 20 of the present invention, for example, has a structure (1) in which at least a substrate sheet, a picture layer, and the transparent resin film 10 are sequentially laminated on each other in the thickness direction, a structure (2) in which at least a decorative board including a support and a picture layer and the transparent resin film 10 are sequentially laminated on each other in the thickness direction, or a structure (3) in which at least an adherend including a picture layer and the transparent resin film 10 are sequentially laminated on each other in the thickness direction.

Hereafter, the substrate 11 constituting the decorative material 20 of the present invention is specifically described.

(Substrate Sheet)

The substrate sheet is not limited, and preferably contains a thermoplastic resin.

Examples of the thermoplastic resin include: olefin-based thermoplastic resins such as low-density polyethylene (including linear low-density polyethylene), medium-density polyethylene, high-density polyethylene, ethylene-α olefin copolymers, homopolypropylene, polymethylpentene, polybutene, ethylene-propylene copolymers, propylene-butene copolymers, ethylene-vinyl acetate copolymers, saponified ethylene-vinyl acetate copolymers, or mixtures of these; thermoplastic ester-based resins such as polyethylene terephthalate, polybutylene terephthalate, polyethylene naphthalate, polyethylene naphthalate-isophthalate copolymers, polycarbonate, or polyarylate; acrylic thermoplastic resins such as polymethyl methacrylate, polyethyl methacrylate, polyethyl acrylate, or polybutyl acrylate; polyamide-based thermoplastic resins such as Nylon 6 or Nylon 66; polyimides; polyurethanes; polystyrenes; acrylonitrile-butadiene-styrene resins; diene-based rubbers such as styrene butadiene rubber, polyisoprene rubber, and chloroprene rubber; non-diene-based rubbers such as butyl rubber and ethylene propylene rubber; natural rubber; thermoplastic elastomers; and polyvinyl chloride.

Each of these thermoplastic resins may be used alone or two or more thereof may be used in admixture. In particular, olefin-based thermoplastic resins are preferred because they have excellent printability of a picture layer and are inexpensive.

The substrate sheet may be colored. In that case, colorants (pigments or dyes) may be added to the thermoplastic resin described above for coloring. Usable examples of the colorants include inorganic pigments such as titanium dioxide, carbon black, and iron oxide and organic pigments such as phthalocyanine blue, as well as various dyes. One or two or more colorants may be selected from known or commercial colorants. The amounts of the colorants may be appropriately determined in accordance with the desired coloration or the like.

The substrate sheet preferably contains a flame retardant described above for the same reason as that for the transparent resin layers and the surface protective layer.

Examples of the flame retardant include phosphinic acid metal salt-based flame retardants, phosphazene-based flame retardants, NOR hindered amine-based flame retardants, halogen-based flame retardants, antimony-based flame retardants, metal hydroxide-based flame retardants, and phosphoric acid ester-based flame retardants. From the environmental standpoint and the standpoint of reducing the amount added for maintaining the transparency of the layer containing the flame retardant, preferred is at least one selected from the group consisting of phosphinic acid metal salt-based flame retardants, phosphazene-based flame retardants, and NOR hindered amine-based flame retardants. From the standpoint of achieving an effect of suppressing flame spread in a horizontal flammability test, preferred is at least one selected from the group consisting of the phosphinic acid metal salt-based flame retardants and the phosphazene-based flame retardants. From the standpoint of achieving an effect of reducing the calorific value in the flammability test in accordance with ISO 5660-1, preferred is a NOR hindered amine-based flame retardant.

The phosphinic acid metal salt-based flame retardant, the phosphazene-based flame retardant, or the NOR hindered amine-based flame retardant used can be appropriately selected from those mentioned for the transparent resin layers.

In the case where the substrate sheet contains the flame retardant, the amount of the flame retardant is preferably 5 parts by mass or more, more preferably 7.5 parts by mass or more based on 100 parts by mass of at least one selected from polyolefin-based thermoplastic resins and polyester-based resins in the substrate sheet. The amount of the flame retardant in the substrate sheet is preferably 30 parts by mass or less, more preferably 20 parts by mass or less. When the lower limit of the amount of the flame retardant in the substrate sheet is within the above range, the flame retardancy of the transparent resin film is further improved. When the upper limit of the amount of the flame retardant in the substrate sheet is within the above range, the substrate sheet shows further excellent strength.

The substrate sheet may optionally contain additives such as fillers, matting agents, blowing agents, lubricants, antistatic agents, antioxidants, ultraviolet absorbers, and light stabilizers.

The substrate sheet may have any thickness. Still, the thickness is preferably about 40 μm-20 mm.

The substrate sheet may have either a single layer structure or a multilayer structure.

In the case where the substrate sheet has a small thickness of 1 mm or less, an adherend described later may be provided on the rear face of the substrate sheet.

(Picture Layer)

The picture layer provides a desired picture (design). The type or the like of the picture is not limited. Examples of the picture include wood-grain patterns, leather patterns, stone grain patterns, grain patterns, tiled patterns, brick-masonry patterns, fabric patterns, geometrical patterns, letters, signs, abstract patterns, floral patterns, landscapes, and mascot characters.

The picture layer may be provided at any site including on the side on which the transparent resin film 10 is laminated of the substrate 11, between the layers included in the substrate 11 (inside the substrate 11), and on the side opposite to the side on which the transparent resin film 10 is laminated of the substrate 11.

The picture layer may be formed by any method. For example, the picture layer may be formed at any site of the substrate 11 such as on the substrate sheet by a known printing method using ink prepared by dissolving (or dispersing) known colorants (dyes or pigments) with a binder resin in a solvent (or a dispersing medium). The substrate 11 may be partly or entirely colored and the binder resin may include a mixture of multiple resins.

From the standpoint of reducing VOC from the decorative material, the ink used may be an aqueous composition.

Examples of the colorants include: inorganic pigments such as carbon black, titanium white, zinc oxide, red iron oxide, ultramarine, and cadmium red; organic pigments such as azo pigments, lake pigments, anthraquinone pigments, quinacridone pigments, phthalocyanine pigments, iso-indolinone pigments, and dioxazine pigments; metallic powder pigments such as aluminum powder and bronze powder; pearl gloss pigments such as titanium oxide-coated mica and bismuth chloride oxide; fluorescent pigments; and luminous pigments. Each of these colorants may be used alone or in combination of two or more. These colorants may be used together with additives such as a filler (e.g., silica), an extender pigment (e.g., organic beads), a neutralizer, or a surfactant.

In addition to hydrophilized polyester-based urethane resins, the binder resin may also include different resins such as polyester, polyacrylate, polyvinyl acetate, polybutadiene, polyvinyl chloride, chlorinated polypropylene, polyethylene, polystyrene, polystyrene-acrylate copolymers, rosin derivatives, adducts of alcohols with styrene-maleic anhydride copolymers, and cellulose-based resins. More specific examples thereof include: polyacrylamide-based resins, poly(meth)acrylic acid-based resins, polyethylene oxide-based resins, poly(N-vinyl pyrrolidone)-based resins, water-soluble polyester-based resins, water-soluble polyamide-based resins, water-soluble amino-based resins, water-soluble phenolic resins, and other water-soluble synthetic resins; and water-soluble natural polymers such as polynucleotides, polypeptides, and polysaccharides. Usable examples further include modified products of natural rubber, synthetic rubber, polyvinyl acetate-based resins, (meth) acrylic resins, polyvinyl chloride resins, and polyurethane-polyacrylic resins, mixtures of these materials including natural rubber, and other resins. Each of these binder resins may be used alone or in combination of two or more.

Examples of the solvent (or a dispersion medium) include: petroleum-based organic solvents such as hexane, heptane, octane, toluene, xylene, ethyl benzene, cyclohexane, and methyl cyclohexane; ester-based organic solvents such as ethyl acetate, butyl acetate, 2-methoxyethyl acetate, and 2-ethoxyethyl acetate; alcohol-based organic solvents such as methyl alcohol, ethyl alcohol, n-propyl alcohol, isopropyl alcohol, isobutyl alcohol, ethylene glycol, and propylene glycol; ketone-based organic solvents such as acetone, methyl ethyl ketone, methyl isobutyl ketone, and cyclohexanone; ether-based organic solvents such as diethyl ether, dioxane, and tetrahydrofuran; chlorine-based organic solvents such as dichloromethane, carbon tetrachloride, trichloroethylene, and tetrachloroethylene; and inorganic solvents such as water. Each of these solvents (or dispersion media) may be used alone or in combination of two or more.

Examples of the printing method used for formation of the picture layer include gravure printing, offset printing, screen printing, flexographic printing, electrostatic printing, and ink-jet printing. Examples of the method for forming an overall solid picture layer include various coating methods such as roll coating, knife coating, air knife coating, die coating, lip coating, comma coating, kiss coating, flow coating, and dip coating. Examples of the method for forming the picture layer further include hand-painting, marbling, photographing, transferring, laser beam drawing, electron beam drawing, partial vapor deposition of metal or the like, and etching. These methods may be combined with different methods.

The picture layer may have any thickness. The thickness may be appropriately determined in accordance with the product characteristics. Still, the thickness is about 0.1-15 µm.

In the decorative material 20 of the present invention, the substrate 11 may further include a transparent adhesive layer, a primer layer, a backer layer, or the like, if needed. In such a case, an adherent may be provided on a rear side of the transparent adhesive layer, the primer layer, the backer layer, or the like.

The transparent adhesive layer and the primer layer each may be a layer similar to the layer described for the transparent resin film 10.

(Backer Layer)

Examples of the backer layer include resin backer layers such as synthetic resin backer layers and foamed resin backer layers, wood-based backer layers formed of cork or the like, and nonwoven fabric-based backer layers. The backer layer is preferably provided as the lowermost layer (on the side opposite to the side on which the transparent resin film 10 is laminated) of the substrate 11.

When the substrate 11 includes the backer layer, the decorative material can have further excellent scratch resistance and impact resistance.

Examples of the resin contained in the synthetic resin backer layer include polypropylene, ethylene-vinyl alcohol copolymers, polyethylene, polymethylpentene, polyethylene terephthalate, high heat resistant polyalkylene terephthalate (e.g., PET-G (trade name, available from Eastman Chemical Company), which is polyethylene terephthalate obtained by substituting part of ethylene glycol with 1,4-cyclohexane dimethanol, diethylene glycol, or the like), polybutylene terephthalate, polyethylene naphthalate, polyethylene naphthalate-isophthalate copolymers, amorphous polyester (A-PET), polycarbonate, polyarylate, polyimide, polystyrene, polyamide, ABS, diene rubbers such as styrene butadiene rubber, isoprene rubber, or chloroprene rubber, non-diene rubbers such as butyl rubber or ethylene propylene rubber, natural rubber, and thermoplastic elastomers. Each of these resins may be used alone or in combination of two or more.

The synthetic resin backer layer may contain hollow beads.

The type, particle size, and amount of the hollow beads may be those described in JP 2014-188941 A.

The synthetic resin backer layer may contain a flame retardant for the same reason as that for the transparent resin layers.

Examples of the flame retardant include phosphinic acid metal salt-based flame retardants, phosphazene-based flame retardants, NOR hindered amine-based flame retardants, halogen-based flame retardants, antimony-based flame retardants, metal hydroxide-based flame retardants, and phosphoric acid ester-based flame retardants. From the environmental standpoint and the standpoint of reducing the amount added for maintaining the transparency of the layer containing the flame retardant, preferred is at least one selected from the group consisting of phosphinic acid metal salt-based flame retardants, phosphazene-based flame retardants, and NOR hindered amine-based flame retardants. From the standpoint of achieving an effect of suppressing flame spread in a horizontal flammability test, preferred is at least one selected from the group consisting of phosphinic acid metal salt-based flame retardants and phosphazene-based flame retardants. From the standpoint of achieving an effect of reducing the calorific value in the flammability test in accordance with ISO 5660-1, preferred is a NOR hindered amine flame retardant.

In the case where the synthetic resin backer layer contains the flame retardant, the amount of the flame retardant in the synthetic resin backer layer is preferably 5% by mass or more, more preferably 7.5% by mass or more based on 100% by mass of the resin in the synthetic resin backer layer. The amount of the flame retardant in the synthetic resin backer layer is preferably 30% by mass or less, more preferably 20% by mass or less. When the lower limit of the amount of the flame retardant in the synthetic resin backer layer is within the above range, the flame retardancy of a decorative material is further improved. When the upper limit of the amount of the flame retardant in the synthetic resin backer layer is within the above range, the synthetic resin backer layer shows further excellent strength.

The synthetic resin backer layer may have any thickness. The thickness is, for example, preferably 100-600 μm, more preferably 150-450 μm.

Examples of the method for forming the synthetic resin backer layer include calendering and extrusion molding of a molten resin. In particular, extrusion molding of a molten resin is suitable. For example, extrusion molding using a T-die is more suitable.

The foamed resin backer layer may be provided as a layer below the synthetic resin backer layer (on the side opposite to the side having a pattern of protrusions and depressions).

The foamed resin backer layer may be a layer described in JP 2014-188941 A.

<Decorative Board>

The decorative material 20 of the present invention may be a decorative board having a structure including at least a support, a picture layer, and the transparent resin film 10 laminated on each other sequentially in the thickness direction, for example.

In this case, the substrate 11 preferably includes at least a support and a picture layer.

The picture layer is suitably the picture layer described above.

(Support)

The support is not limited, and may be appropriately selected from various paper materials, plastic films, woody boards such as lumber, and ceramic materials in accordance with the application. Each of these materials may be used alone. Alternatively, any combination of materials may be formed into a laminate, such as a complex of paper materials or a complex of a paper material and a plastic film.

Examples of the paper materials include tissue paper, kraft paper, and titanium paper. These paper substrates may contain resins such as acrylic resins, styrene butadiene rubber, melamine resins, or urethane resins (by immersion in a resin after papermaking, or filling upon papermaking) for the purpose of increasing the interfiber strength of the paper substrate or the interlayer strength between the paper substrate and another layer and preventing dusting. Examples thereof include interpaper reinforced paper and resin-impregnated paper.

Examples of the paper materials also include various paper materials often used in the building material field such as cotton linter paper, cardboard, base paper for plaster board, and raw webs of vinyl wallpaper which is a paper material provided with a vinyl chloride layer on the surface.

The examples further include those often used in the paperwork field, typical printing, and packaging, such as coated paper, art paper, sulfate paper, glassine paper, parchment paper, paraffin paper, and Japanese paper. Though they are distinguished from these paper materials, woven fabrics or nonwoven fabrics of various fibers having an appearance and characteristics similar to those of paper are also usable as substrates. Examples of the various fibers include inorganic fibers such as glass fiber, asbestos fiber, potassium titanate fiber, alumina fiber, silica fiber, and carbon fiber and synthetic resin fibers such as polyester fiber, acrylic fiber, and vinylon fiber.

In the case where the support such as paper materials is a porous substrate and the porous substrate is impregnated with a thermosetting resin, conventionally known thermosetting resins are widely usable. Examples of the thermosetting resins include unsaturated polyester resins, polyurethane resins (including two-component curable polyurethanes), epoxy resins, aminoalkyd resins, phenolic resins, urea resins, diallylphthalate resins, melamine resins, guanamine resins, melamine-urea cocondensated resins, silicon resins, and polysiloxane resins.

A layer obtained by impregnating a paper material with a thermosetting resin and curing the resin is also referred to as a thermosetting resin layer. In some cases, the thermosetting resin layer finally serves as a surface protective layer.

The porous substrate is impregnated with any of the thermosetting resin by supplying the thermosetting resin from one or both of the front and rear sides of the porous substrate. Any method may be employed for the impregnation and examples include: immersion of a mold release layer side surface or the opposite side surface of the porous substrate in a thermosetting resin bath; application of a thermosetting resin to the mold release layer side surface, the opposite side surface, or both surfaces of the porous substrate using a coater such as a kiss coater or a comma coater; and spraying of a thermosetting resin to the mold release layer side surface, the opposite side surface, or both surfaces of the porous substrate using a device such as a spray device or a shower device.

Specific examples of the resin contained in the plastic films include polyolefin resins (e.g., polyethylene, polypropylene), vinyl resins (e.g., vinyl chloride resin, vinylidene chloride resin, phenolic resin, polyvinyl alcohol, ethylene-vinyl alcohol copolymer); polyester resins (e.g., polyethylene terephthalate, polybutylene terephthalate), acrylic resins (e.g., polymethyl methacrylate, polymethyl acrylate, polyethyl methacrylate), polystyrene, acrylonitrile-butadiene-styrene copolymers (ABS resins), cellulose triacetate, and polycarbonate. Among these, preferred are polyolefin resins, vinyl chloride resins, polyester resins, and acrylic resins from the standpoint of physical properties such as weather resistance and water resistance, printability, molding processability, cost, and the like.

The support may contain the flame retardant mentioned above. The support containing the flame retardant can contribute to further improvement of the flame retardancy of the decorative board for the same reason as for the transparent resin layers. The flame retardant that can be contained in the support is preferably the same as one used in the transparent resin layers and the like.

The support may have any thickness. In the case where the support is a plastic film, the thickness is preferably 20-200 μm, more preferably 40-160 μm, still more preferably 40-100 μm.

In the case where the support is a paper material, the basis weight is typically preferably 20-150 g/m², more preferably 30-100 g/m².

The shape of the support is not limited to a flat plate shape, and may be a special shape such as a three-dimensional shape.

For the purpose of improving adhesion between the support and a layer provided on the support, one surface or both surfaces of the support may be subjected to adhesion enhancing treatment such as physical treatment or chemical surface treatment.

(Phenolic Resin Impregnated Paper)

The decorative board may include a phenolic resin impregnated paper, if needed.

The phenolic resin impregnated paper may be provided on the surface on the side opposite to the side on which an abrasion resistance layer and a mold release layer are formed of the porous substrate.

The phenolic resin impregnated paper is typically produced by impregnating kraft paper having a basis weight of about 150-250 g/m², as core paper, with a phenolic resin to a degree of impregnation of about 45-60% and drying the resulting paper at about 100-140° C. The phenolic resin impregnated paper used may be a commercial product. In the case of using a phenolic resin impregnated paper, the rear surface of the porous substrate may be subjected to corona discharge treatment or a rear primer layer may be formed by applying the primer layer described above on the rear surface of the porous substrate, if needed.

(Sealer Layer)

In the case where the support is a substrate having impregnation properties such as a paper material, a sealer layer may be provided between the support and the picture layer.

The sealer layer preferably contains a cured product of a curable resin composition such as a thermosetting resin composition or an ionizing radiation-curable resin composition, more preferably a cured product of a thermosetting resin composition.

The amount of the cured product of the curable resin composition in the total solid content of the sealer layer is preferably 50% by mass or more, more preferably 65-95% by mass.

Examples of the thermosetting resin composition and the ionizing radiation-curable resin composition for the sealer layer include those exemplified for the surface protective layer. The thermosetting resin composition is preferably a two-component curable resin containing a polyol and an isocyanate, more preferably a two-component curable resin containing an acrylic polyol and hexamethylene diisocyanate.

The sealer layer preferably contains particles from the standpoint of drying suitability and viscosity adjustment. The amount of the particles in the total solid content of the sealer layer is preferably 5-50% by mass, more preferably 5-35% by mass.

Examples of the particles in the sealer layer include those exemplified for the surface protective layer. The particles are preferably inorganic particles. Among the inorganic particles, silica particles are preferred.

The particles have an average particle size of preferably 0.1-2.0 μm, more preferably 0.2-1.5 μm.

The sealer layer has a thickness of preferably 0.5-5 μm, more preferably 1-3 μm from the standpoint of the balance between impregnation prevention and cost-effectiveness.

The substrate 11 may be produced by any method. An example of the method is laminating the above layers with a layer such as the transparent adhesive layer or the primer layer therebetween.

Any method may be employed for laminating the transparent resin film 10 on the substrate 11 to produce the decorative material 20. Examples of the method include a method of laminating the above layers with the transparent adhesive layer or the primer layer therebetween or a method of thermally laminating the transparent resin film 10 on the substrate 11 including a picture layer.

<Adherend>

The decorative material 20 of the present invention may be laminated on an adherend in a manner that the surface on the side opposite to the side having a pattern of protrusions and depressions is in contact with the adherend.

In the case where an adherend including the picture layer is used, the decorative material 20 of the present invention can be obtained by providing the transparent resin film 10 on the adherend having the picture layer. The picture layer is suitably the picture layer described above.

Examples of the material of the adherend include wood sheets such as wood single panels, plywood panels, particle boards, medium-density fiberboards (MDF), and high-density fiberboard (HDF); plaster-based sheets such as plaster sheets and plaster slag sheets; cement sheets such as calcium silicate sheets, asbestos slate sheets, cellular lightweight concrete sheets, and hollow extruded cement sheets; fiber cement sheets such as pulp cement sheets, asbestos cement sheets, and wood chip cement sheets; ceramic sheets such as pottery sheets, porcelain sheets, earthenware sheets, glass sheets, and enamel sheets; metallic sheets such as iron sheets, galvanized steel sheets, polyvinyl chloride sol-coated steel sheets, aluminum sheets, and copper sheets; thermoplastic resin sheets such as polyolefin resin sheets, acrylic resin sheets, ABS sheets, polycarbonate sheets, and polyvinyl chloride resin sheets; thermosetting resin sheets such as phenolic resin sheets, urea resin sheets, unsaturated polyester resin sheets, polyurethane resin sheets, epoxy resin sheets, and melamine resin sheets; and complex materials obtained by curing various fiber substrates (e.g., glass fiber nonwoven fabric, woven fabric, paper) impregnated with resins (e.g., phenolic resins, urea resins, unsaturated polyester resins, polyurethane resins, epoxy resins, melamine resins, diallylphthalate resins), i.e., FRP sheets. Each of these materials may be used alone as a substrate or two or more of these may be laminated to be used as a complex substrate.

The adherend may have any thickness.

Moreover, the thermoplastic resin sheets or the thermosetting resin sheets may contain, if needed, additives such as colorants (pigments or dyes), fillers such as wood flour or calcium carbonate, matting agents such as silica, blowing agents, flame retardants, lubricants such as talc, antistatic agents, antioxidants, ultraviolet absorbers, or light stabilizers.

Lamination to the adherend may be carried out by any method. Examples of the method include lamination using the primer layer described above or lamination using an adhesive.

The adhesive may be appropriately selected from known additives in accordance with the type of the adherend or the like. Examples of the adhesive include polyvinyl acetate, urethane resins, acrylic resins, urethane-acrylic resins (including copolymers), polyvinyl chloride, vinyl chloride-vinyl acetate copolymers, ethylene-acrylic acid copolymers, and ionomers. The examples further include butadiene-acrylonitrile rubber, neoprene rubber, and natural rubber.

The transparent resin film 10 of the present invention has an extremely smooth surface on the side to be laminated on a substrate to prevent entering of air bubbles when bonded to the substrate, and has a pattern of protrusions and depressions on the side opposite to the side to be laminated on the substrate to provide high design quality.

The decorative material 20 including the transparent resin film 10 of the present invention is suitably usable for, for example, interior materials for walls, ceilings, floors, and the like of buildings; joinery such as window frames, doors, and handrails; furniture; casings for household appliances, OA equipment, and the like; and exterior materials for front doors and the like.

EXAMPLES

The present invention is more specifically described with reference to, but not limited to, examples hereinbelow.

Example 1

A polypropylene-based resin (thickness of 60 μm) was provided as a base layer. A primer agent (thickness of 2 μm) was applied to one face of the base layer. On the other face of the base layer was laminated a polypropylene-based resin (thickness of 60 μm, top layer) by extrusion thermal lamination. At the same time, embossing was performed by cooling and embossing the base and top layers using a press roll (hardness: 25). The surface subjected to the embossing was corona-treated, followed by application of a primer agent (thickness of 2 μm) thereto. To the surface was applied an ionizing radiation curable resin (application amount: 15 μm) by gravure coating, followed by irradiation with an electron beam using an electron irradiation device under the conditions of an accelerating voltage of 165 keV and 5 Mrad to form a surface protective layer. Thus, a transparent resin film was produced.

The transparent resin film had a maximum height Rz (1) on the surface protective layer side of 20 μm and a maximum height Rz (2) on the other side of 15 μm.

Then, to the face with the primer agent on the base layer side of the transparent resin film was applied an ester-based adhesive (application amount: 5 g/m$^2$), and the transparent resin film was laminated on the picture layer side of a MDF including a picture layer. The laminate was allowed to stand still under a pressure of 10 kg/m$^2$ at 20° C. for three days. Thus, a decorative material was produced.

The presence or absence of air bubbles therein was checked.

Example 2

A transparent resin film and a decorative material were produced as in Example 1, except that the pattern of protrusions and depressions and hardness of the press roll were changed (hardness: 40).

The transparent resin film had a maximum height Rz (1) of 20 μm and a maximum height Rz (2) of 10 μm.

Example 3

A transparent resin film and a decorative material were produced as in Example 1, except that the thickness of the transparent resin film laminated by extrusion thermal lamination was changed to 240 μm and that the pattern of protrusions and depressions and hardness of the press roll were changed (hardness: 40).

The transparent resin film had a maximum height Rz (1) of 200 μm and a maximum height Rz (2) of 15 μm.

Example 4

A transparent resin film and a decorative material were produced as in Example 1, except that the thickness of the transparent resin film laminated by extrusion thermal lamination was changed to 240 μm and that the pattern of protrusions and depressions and hardness of the press roll were changed (hardness: 50).

The transparent resin film had a maximum height Rz (1) of 200 μm and a maximum height Rz (2) of 10 μm.

Example 5

A transparent resin film and a decorative material were produced as in Example 1, except that the thickness of the transparent resin film laminated by extrusion thermal lamination was changed to 240 μm and that the pattern of protrusions and depressions and hardness of the press roll were changed (hardness: 55).

The transparent resin film had a maximum height Rz (1) of 200 μm and a maximum height Rz (2) of 5 μm.

Example 6

A transparent resin film and a decorative material were produced as in Example 1, except that the polypropylene-based resin laminated by extrusion thermal lamination was a polypropylene-based resin (thickness of 60 μm, top layer) containing a flame retardant (phosphinic acid metal salt-based flame retardant, product name: Pekoflam STC, available from Archroma, amount based on the total mass of the transparent resin layers: 4.4% by mass).

Example 7

A transparent resin film and a decorative material were produced as in Example 1, except that the polypropylene-based resin laminated by extrusion thermal lamination was a polypropylene-based resin (thickness of 60 μm, top layer) containing a flame retardant (phosphinic acid metal salt-based flame retardant, product name: Pekoflam STC, available from Archroma, amount based on the total mass of the transparent resin layers: 4.5% by mass) and a hydrophilic fumed silica (AEROSIL, available from Nippon Aerosil Co., Ltd, amount based on the total mass of the transparent resin layers: 4.5% by mass).

Comparative Example 1

A transparent resin film and a decorative material were produced as in Example 1, except that the pattern of protrusions and depressions and hardness of the press roll were changed (hardness: 20).

The transparent resin film had a maximum height Rz (1) of 20 μm and a maximum height Rz (2) of 18 μm.

Comparative Example 2

A transparent resin film and a decorative material were produced as in Example 1, except that the pattern of protrusions and depressions and hardness of the press roll were changed (hardness: 40).

The transparent resin film had a maximum height Rz (1) of 15 μm and a maximum height Rz (2) of 5 μm.

Comparative Example 3

A transparent resin film and a decorative material were produced as in Example 1, except that the thickness of the transparent resin film laminated by extrusion thermal lamination was changed to 240 μm and that the pattern of protrusions and depressions and hardness of the press roll were changed (hardness: 40).

The transparent resin film had a maximum height Rz (1) of 210 μm and a maximum height Rz (2) of 18 μm.

Comparative Example 4

A polypropylene-based resin (thickness of 60 μm) was provided as a base layer. A primer agent (thickness of 2 μm) was applied to one face of the base layer. On the other face of the base layer was laminated a polypropylene-based resin (thickness of 240 μm, top layer) by extrusion thermal lamination. To the side opposite to the base layer side of the top layer was applied a primer agent (thickness of 2 μm). To the surface of the primer agent was applied an ionizing radiation curable resin (application amount: 15 μm) by gravure coating, followed by irradiation with an electron beam using an electron irradiation device under the conditions of an accelerating voltage of 165 keV and 5 Mrad to form a surface protective layer.

The face with the surface protective layer was subjected to embossing using an embossing roll (hardness: 40). Thus, a transparent resin film was produced.

The transparent resin film had a maximum height Rz (1) of 20 μm and a maximum height Rz (2) of 18 μm.

Then, to the face with the primer agent on the base layer side of the transparent resin film was applied an ester-based adhesive (application amount: 5 g/m$^2$), and the transparent resin film was laminated on the picture layer side of a MDF including a picture layer. The laminate was allowed to stand still under a pressure of 10 kg/m$^2$ at 20° C. for three days. Thus, a decorative material was produced.

The presence or absence of air bubbles therein was checked.

<Maximum Height Rz>

The maximum heights RZ (1) and (2) of the transparent resin film obtained in each of the examples and comparative examples were determined by the measurement with a surface profilometer ("SURFCOM-FLEX-50A" available from Tokyo Seimitsu Co., Ltd.) under the following conditions.

(Measurement Conditions)
  Number of measurements: n=5 (at any five points)
  Standard for calculation: JIS'01
  Measurement type: roughness measurement
  Evaluation length: 12.5 mm
  Cut-off value: 2.5 mm
  Measurement speed: 0.60 mm/s
  Filter type: Gaussian filter
  Form elimination: straight line
  λs value: 8.0 μm In the case of a directional pattern of protrusions and depressions, the measurement was performed in the flow direction and in a direction perpendicular to the flow direction, and the larger measurement value was taken as the maximum height (Rz).

<Hardness of Press Roll>

The hardness of the press roll used in each of the examples and comparative examples was determined as follows. An indenter point of a type D durometer defined in JIS K 6253-3 (2012) was pressed against a curved portion of the press roll to deform the press roll. The indentation depth at which the resistance force of the roll and the force of the spring were in balance was used for determining the hardness.

(Thickness Stability of Top Layer)

The transparent resin film obtained in each of the examples and comparative examples was cut at an arbitrarily selected part in the lamination direction. The resulting cross section was observed using a digital microscope (model: VHX-5000, available from KEYENCE CORPORATION, magnification: 500 times) to determine the maximum thickness and the minimum thickness of the top layer. The thickness stability of the top layer was evaluated based on the following criteria in which the difference between the obtained thicknesses was X (μm).
  ++: X≤5 μm
  +: 5 μm<X≤10 μm
  +−: 10 μm<X≤15 μm
  −: 15 μm<X (Design Quality 1)

The decorative material obtained in each of the examples and comparative examples was visually checked, and the design quality thereof was evaluated based on the following criteria.
  ++: A tactile design was highly provided.
  +: A tactile design was provided to some degree.
  −: A tactile design was not provided or air bubbles entered.

(Design Quality 2)

The printed patterns of the decorative boards obtained in Example 1 and Example 7 were visually evaluated. Table 3 shows the results.
  ++: The printed pattern was clearly visible.
  +: The printed pattern was slightly clouded.
  −: The printed pattern was not clearly visible.

(Presence or Absence of Air Bubbles)

The decorative material obtained in each of the examples and comparative examples was visually observed to evaluate the presence or absence of air bubbles based on the following criteria.

Present: Air bubbles were observed in an arbitrarily selected one-centimeter square region.

Absent: No air bubbles were observed in an arbitrarily selected one-centimeter square region.

(Evaluation on Flame Retardancy)

[Horizontal Flammability Test (Flame Retardancy: Unlikelihood of Flame Spread)]

The decorative materials obtained in Examples 1 and 6 were each cut into a size of 9 cm×30 cm as a specimen.

Figure 4:
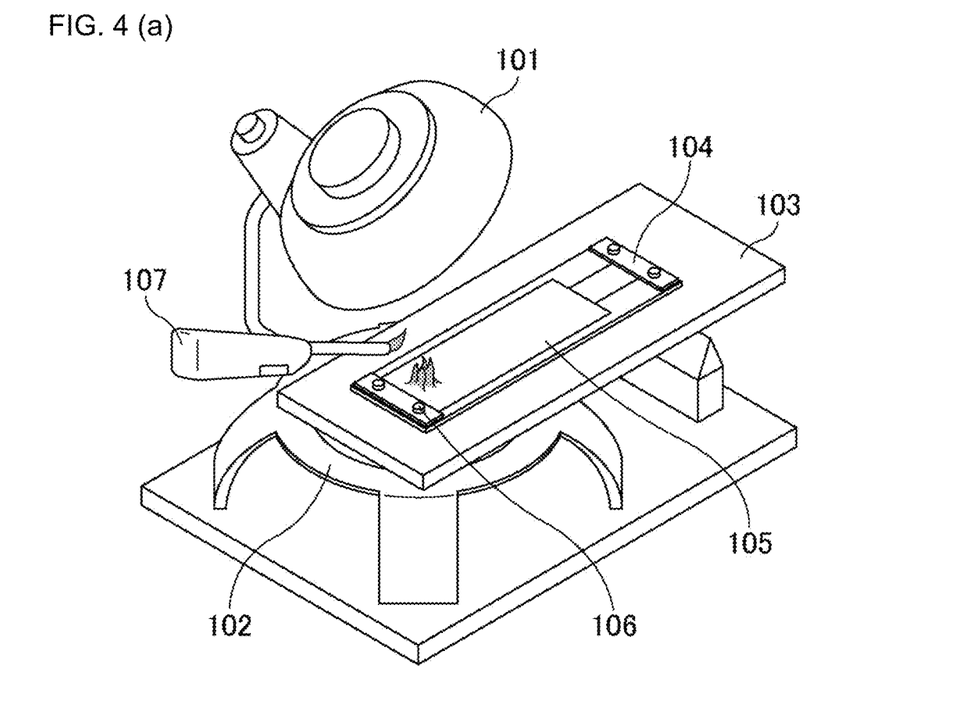
FIG. 4(a) and FIG. 4(b) are schematic views for explaining a method for evaluating flame retardancy.

As illustrated in FIGS. 4(a) and 4(b), on a table 102 of a commercial household heater 101 (voltage: AC 100 V, power consumption: 1200 W) was placed a metallic rectangular board 103. A metallic frame 104 was set on the board 103, and a specimen 105 was placed inside the frame 104. The test for determining unlikelihood of flame spread was performed at a heater angle of 45° and a heater output of 4/5.

Specifically, the specimen was pre-heated using the household heater for two minutes. Then, as illustrated in FIG. 4(a), the specimen was heated with a lighter 107 at an end portion 106 on the heater side in the longitudinal direction of the specimen for one minute to catch flame, and the flame was allowed to spread in the longitudinal direction of the specimen 105 as illustrated in FIG. 4(b).

The state of flame spread was visually observed, and the distance of spread (L1) was evaluated as described below.

[Distance of Spread (L1)]

The flame spread distance was measured from the initial ignition of the specimen, excluding the flame of the lighter, as the distance of spread (L1). The distance of spread (L1) was evaluated based on the following criteria. One rated as + or better is acceptable in actual use.
+: L1 was shorter than 10 cm.
−: L1 was 10 cm or longer.

TABLE 1

| | Comparative Example 1 | Example 1 | Comparative Example 2 | Example 2 | Example 3 | Comparative Example 3 | Comparative Example 4 | Example 4 | Example 5 |
|---|---|---|---|---|---|---|---|---|---|
| Maximum height Rz (1) (μm) | 20 | 20 | 15 | 20 | 200 | 210 | 20 | 200 | 200 |
| Rz (2) (μm) | 18 | 15 | 5 | 10 | 15 | 18 | 18 | 10 | 5 |
| Hardness of press roll | 20 | 25 | | | 40 | | | 50 | 55 |
| Thickness stability of top layer | ++ | ++ | ++ | ++ | ++ | ++ | ++ | + | +− |
| Application amount of adhesive (g/m$^2$) | | | | | 5 | | | | |
| Design quality 1 | − | + | − | + | ++ | − | − | ++ | ++ |
| Presence or absence of air bubbles | Present | Absent | Absent | Absent | Absent | Present | Present | Absent | Absent |

TABLE 2

| | Example 1 | Example 6 |
|---|---|---|
| Flame retardancy | − | + |

TABLE 3

| | Example 1 | Example 7 |
|---|---|---|
| Design quality 2 | + | ++ |

The transparent resin film obtained in each of the examples was confirmed to be able to prevent entering of air bubbles when bonded to a substrate and can provide high design quality attributable to the pattern of protrusions and depressions on the side opposite to the side to be laminated on a substrate.

In contrast, in Comparative Examples 1 and 3, the transparent resin films had a maximum height Rz (2) of higher than 15 μm to problematically allow entering of air bubbles, resulting in poor design quality. In Comparative Example 2, the transparent resin film having a maximum height Rz (1) of lower than 20 μm had a poor tactile design to provide insufficient design quality. In Comparative Example 4 in which embossing was performed after thermal lamination of the base layer and the top layer, the transparent resin film had a high maximum height Rz (2) to allow entering of air bubbles, resulting in poor design quality.

The transparent resin film obtained in Example 6 in which a flame retardant was added to the top layer was confirmed to have higher flame retardancy than the transparent resin film obtained in Example 1 in which no flame retardant was added.

The transparent resin film obtained in Example 7 in which fumed silica was added together with a flame retardant to the top layer was confirmed to have higher transparency than the transparent resin film obtained in Example 1 in which no fumed silica was added.

INDUSTRIAL APPLICABILITY

The present invention can provide a transparent resin film that has an extremely smooth surface on a side to be laminated on a substrate to prevent entering of air bubbles when bonded to a substrate and has a pattern of protrusions and depressions on a side opposite to the side to be laminated to provide high design quality.

The decorative material of the present invention including the transparent resin film of the present invention is suitably usable for interior materials for walls, ceilings, floors, and the like of buildings; joinery such as window frames, doors, and handrails; furniture; casings for household appliances, OA equipment, and the like; and exterior materials for front doors and the like.

REFERENCE SIGNS LIST 1 base layer
2 top layer
3 surface protective layer
10 transparent resin film
11 substrate including a picture layer
20 decorative material
101 household heater
102 table of household heater
103 rectangular board
104 metallic frame
105 specimen
106 end portion
107 lighter

The invention claimed is:

1. A transparent resin film to be laminated on a substrate including a picture layer,
   the transparent resin film having a pattern of protrusions and depressions with a maximum height Rz (1) defined in JIS B 0601 (2001) of 20 μm or higher and 200 μm or lower on a side opposite to a side to be laminated on the substrate,
   the transparent resin film having a maximum height Rz (2) defined in JIS B 0601 (2001) of 15 μm or lower on the side to be laminated on the substrate.

2. The transparent resin film according to claim 1, comprising at least multiple transparent resin layers.

3. The transparent resin film according to claim 1, comprising a surface protective layer on the side opposite to the side to be laminated on the substrate.

4. The transparent resin film according to claim 1, containing a flame retardant.

5. The transparent resin film according to claim 4, wherein a layer containing the flame retardant in the transparent resin film contains a filler.

6. The transparent resin film according to claim 3,
wherein the surface protective layer contains a flame retardant.

7. The transparent resin film according to claim 4,
wherein the flame retardant is at least one selected from the group consisting of a phosphinic acid metal salt-based flame retardant, a phosphazene-based flame retardant, and a NOR hindered amine-based flame retardant.

8. A method for producing a transparent resin film to be laminated on a substrate including a picture layer, the method comprising:
laminating multiple transparent resin layers by thermal lamination to provide a laminate while embossing a side of the laminate opposite to a side to be laminated on the substrate to form a pattern of protrusions and depressions having a maximum height Rz (1) defined in JIS B 0601 (2001) of 20 μm or higher and 200 μm or lower on the side opposite to the side to be laminated on the substrate,
the transparent resin film having a maximum height Rz (2) defined in JIS B 0601 (2001) of 15 μm or lower on the side to be laminated on the substrate.

9. The method for producing a transparent resin film according to claim 8,
wherein the embossing is performed using a press roll having a type D durometer hardness defined in JIS K 6253-3 (2012) of 25 or more and 50 or less.

10. A decorative material comprising:
a substrate including a picture layer; and
the transparent resin film according to claim 1 laminated on the substrate.

11. The transparent resin film according to claim 2,
comprising a surface protective layer on the side opposite to the side to be laminated on the substrate.

12. The transparent resin film according to claim 2, containing a flame retardant.

13. The transparent resin film according to claim 3, containing a flame retardant.

14. The transparent resin film according to claim 12,
wherein a layer containing the flame retardant in the transparent resin film contains a filler.

15. The transparent resin film according to claim 13,
wherein a layer containing the flame retardant in the transparent resin film contains a filler.

16. The transparent resin film according to claim 11,
wherein the surface protective layer contains a flame retardant.

17. The transparent resin film according to claim 5,
wherein the flame retardant is at least one selected from the group consisting of a phosphinic acid metal salt-based flame retardant, a phosphazene-based flame retardant, and a NOR hindered amine-based flame retardant.

18. The transparent resin film according to claim 6,
wherein the flame retardant is at least one selected from the group consisting of a phosphinic acid metal salt-based flame retardant, a phosphazene-based flame retardant, and a NOR hindered amine-based flame.

19. A decorative material comprising:
a substrate including a picture layer; and
the transparent resin film according to claim 2 laminated on the substrate.

20. A decorative material comprising:
a substrate including a picture layer; and
the transparent resin film according to claim 3 laminated on the substrate.

* * * * *